Jan. 15, 1957     I. E. COX     2,777,738
JOURNAL BEARING LUBRICATOR

Filed Aug. 25, 1954     9 Sheets-Sheet 1

Inventor
Isaac Eugene Cox
By Wallace and Cannon
Attorneys

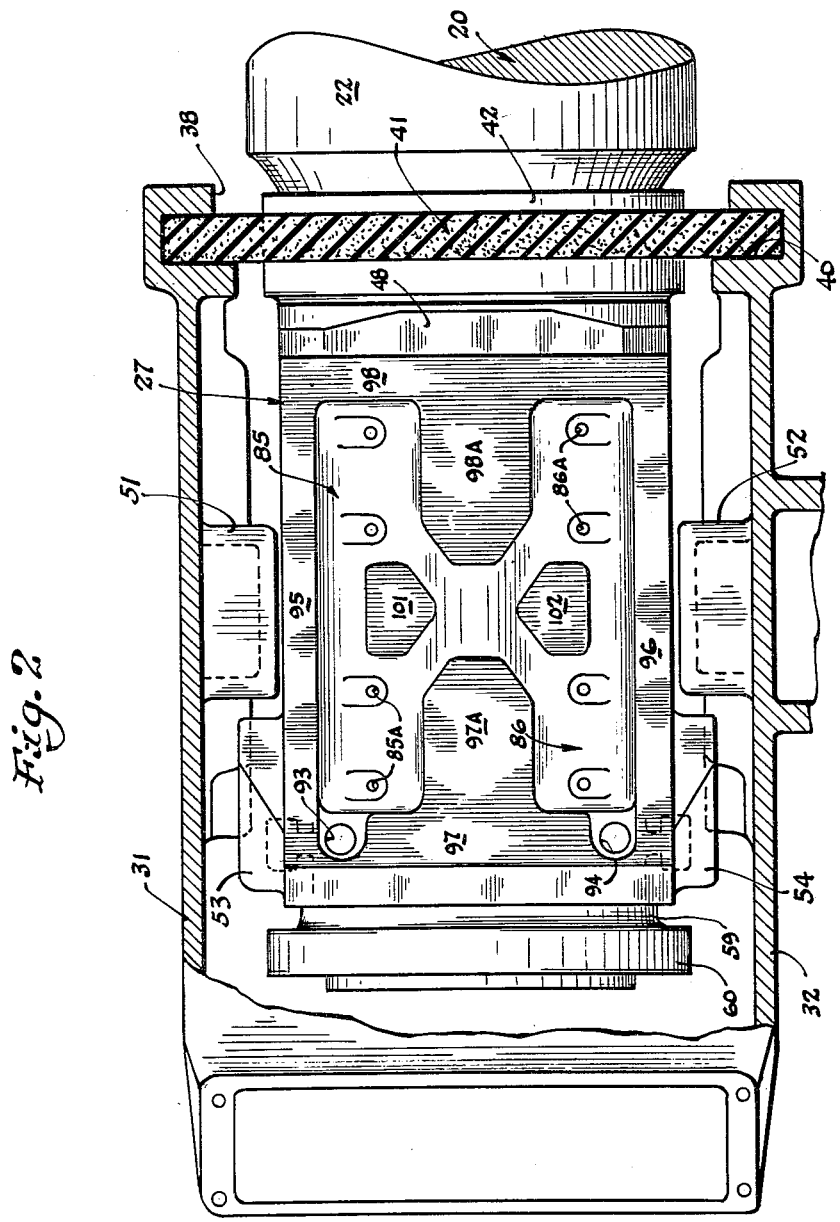

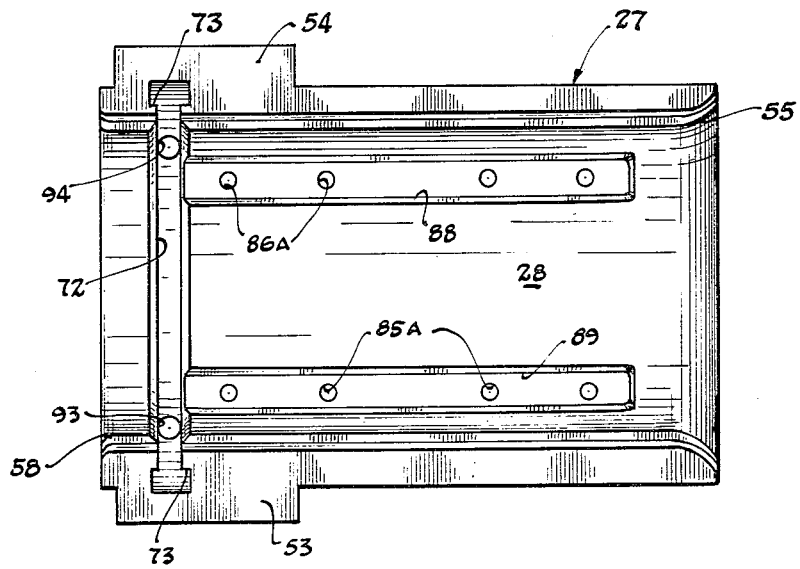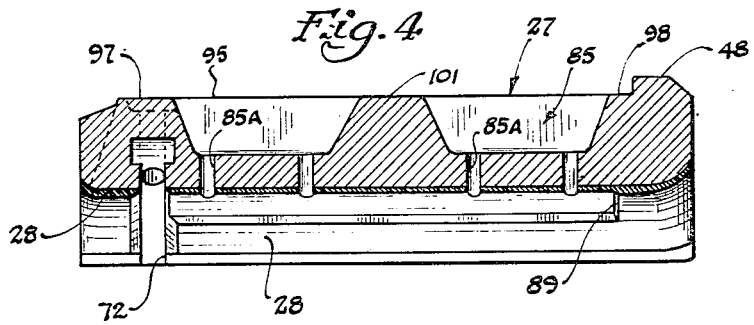

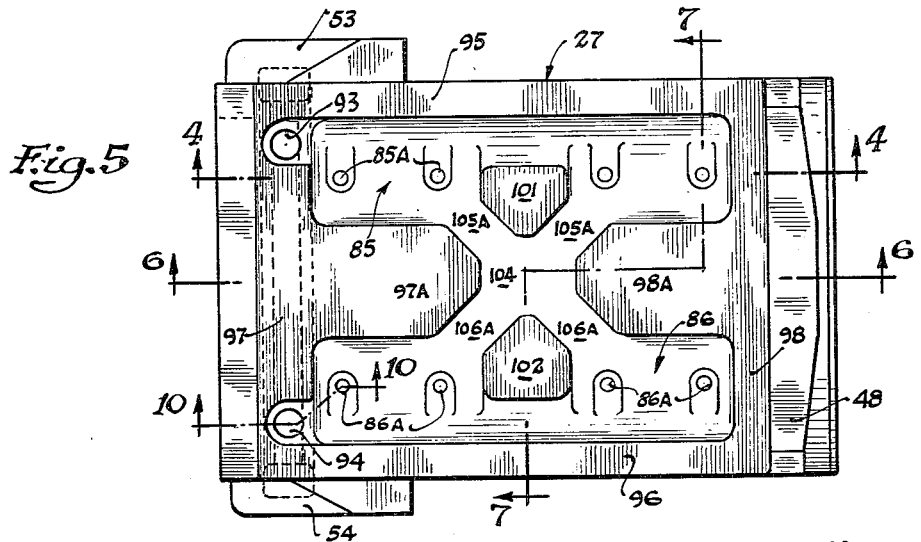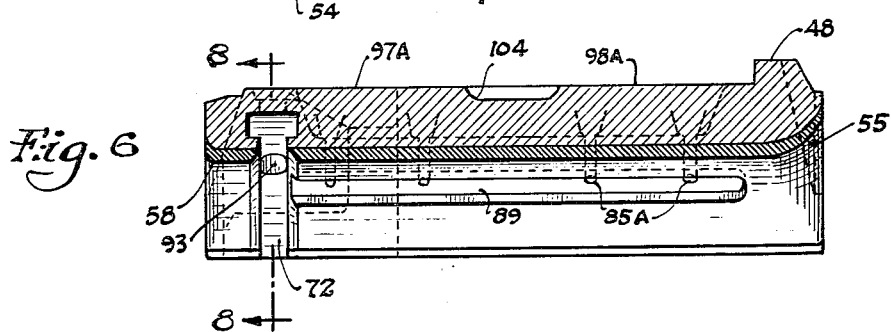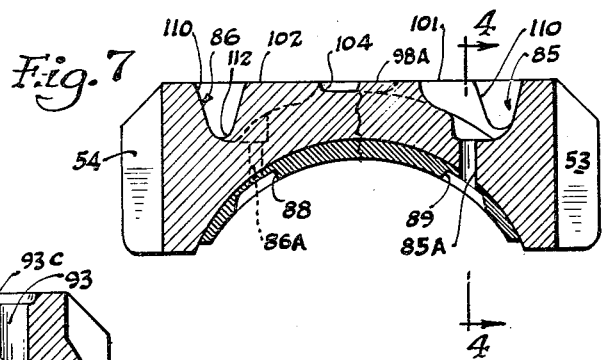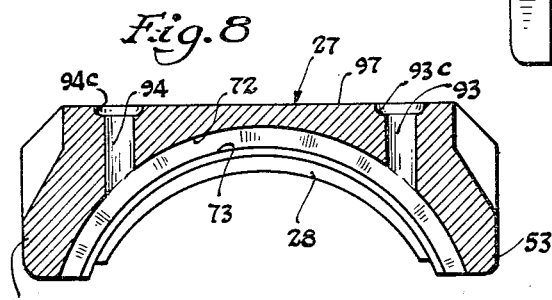

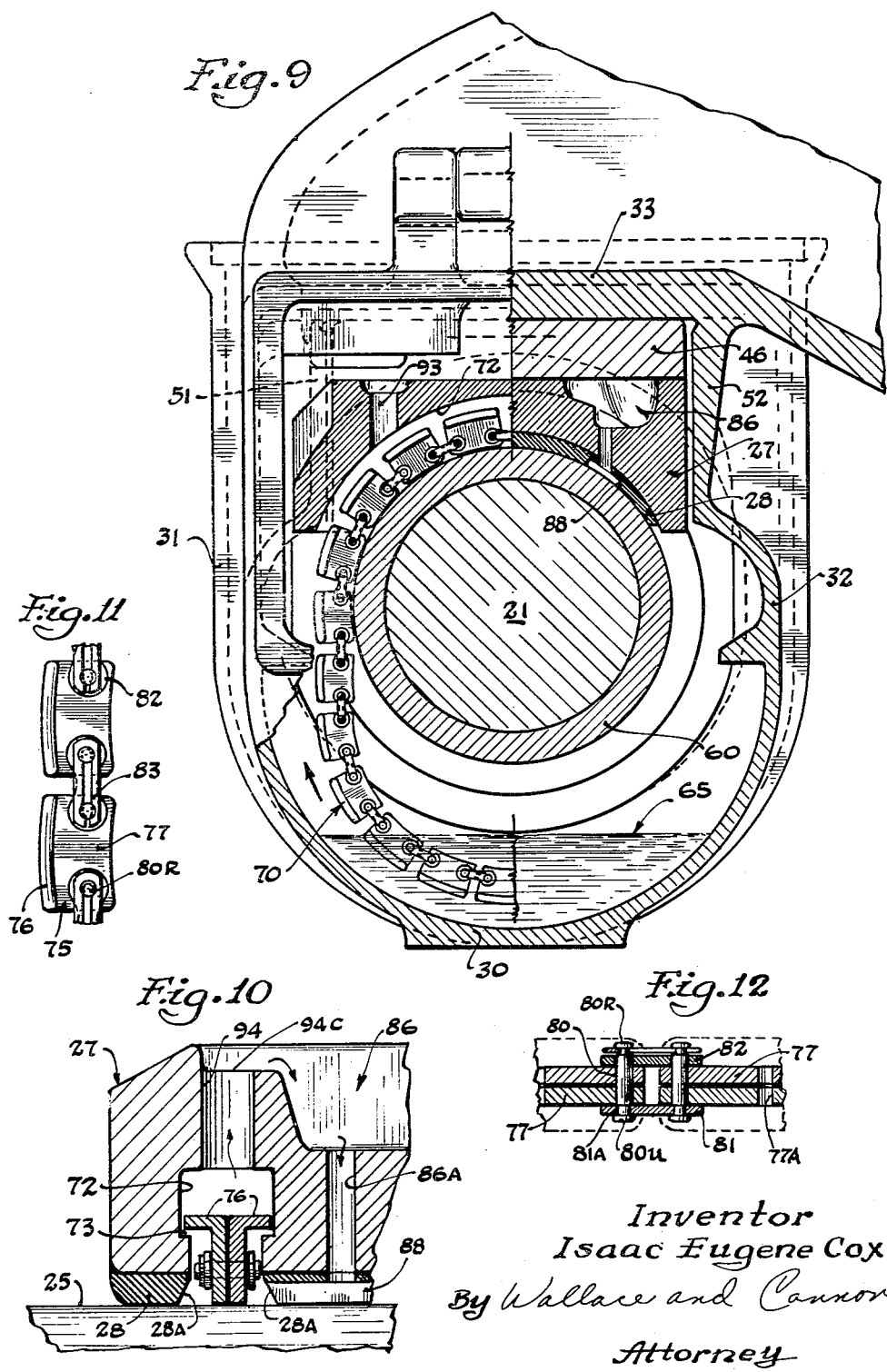

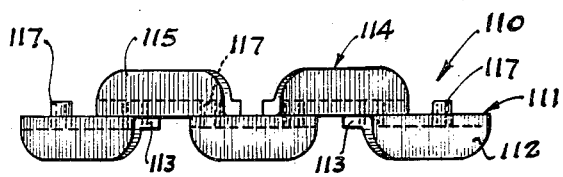
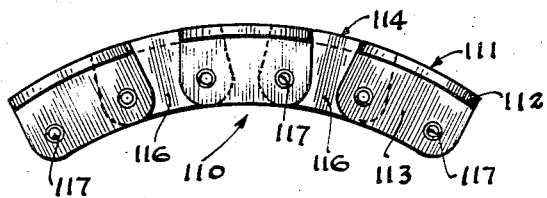
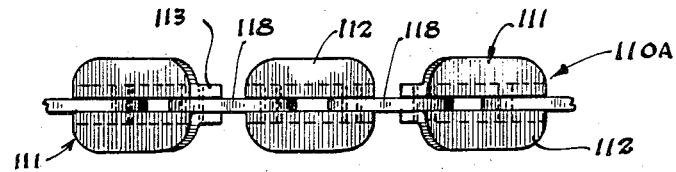
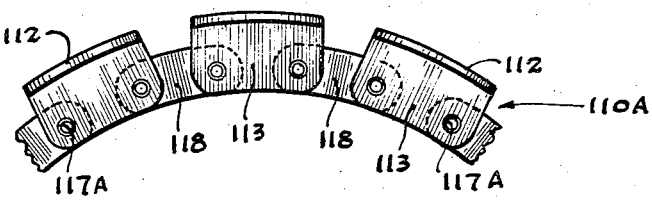
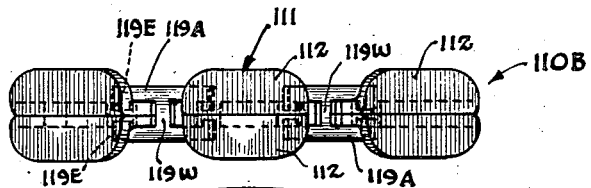
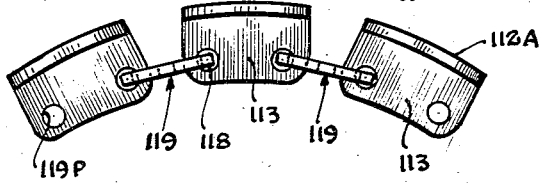

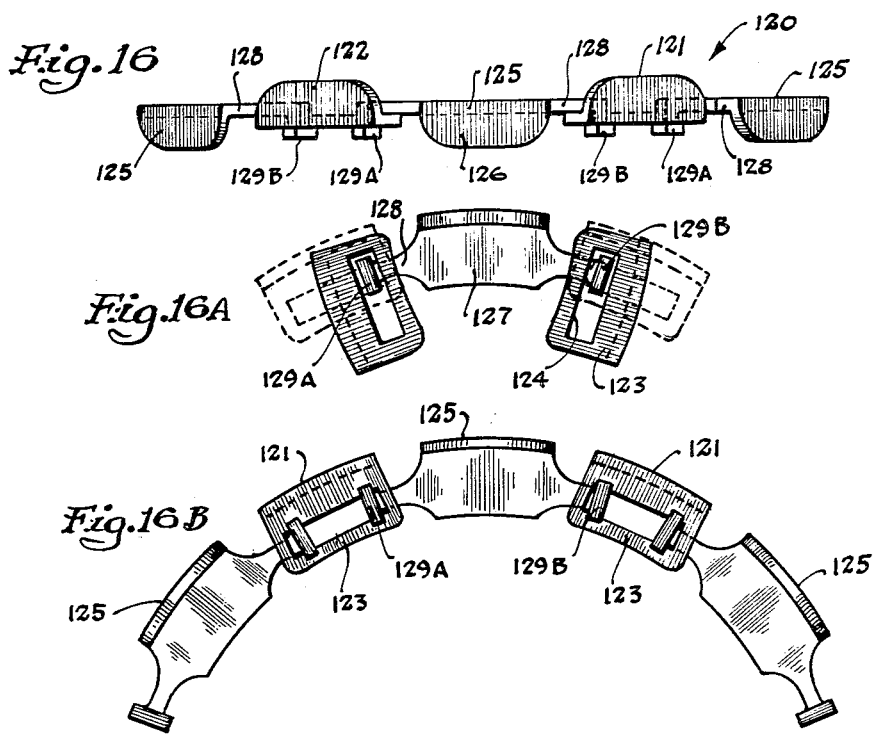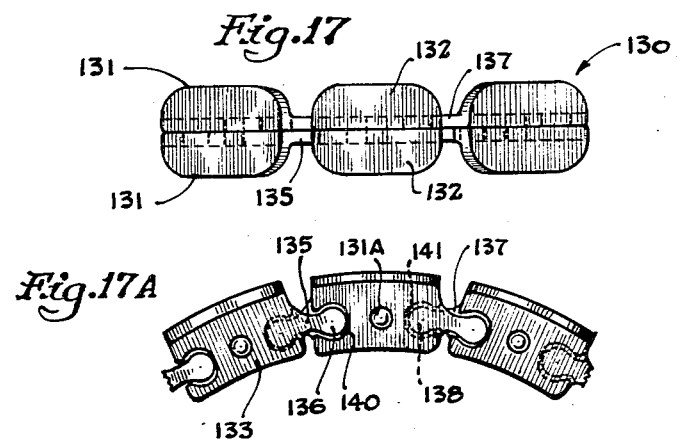

Inventor
Isaac Eugene Cox
By Wallace and Cannon
Attorneys

Jan. 15, 1957 I. E. COX 2,777,738
JOURNAL BEARING LUBRICATOR
Filed Aug. 25, 1954 9 Sheets-Sheet 9

Inventor
Isaac Eugene Cox
By Wallace and Cannon
Attorneys

United States Patent Office 2,777,738
Patented Jan. 15, 1957

2,777,738
JOURNAL BEARING LUBRICATOR

Isaac Eugene Cox, Kirkwood, Mo., assignor to American Brake Shoe Company, Wilmington, Del., a corporation of Delaware Application August 25, 1954, Serial No. 452,147

12 Claims. (Cl. 308—85)

This invention relates to a lubricator for a railway journal bearing.

Over the years, various different arrangements have been resorted to for lubricating the bearing or so-called brass that is disposed in the journal box of a railway car affording a bearing surface for the car journal. It is generally conceded that oil soaked waste packing disposed in the journal box to engage the journal is undesirable because this particular arrangement for lubricating the journal is recognized as a constant source of "hot box" problems engendered by loose particles or strands of waste being trapped between the journal and the journal bearing where the frictional heat eventually ignites the waste.

As distinguished from a composition lubricator of the foregoing kind, the journal lubricator of the present invention is of a mechanical nature in that it includes an endless flexible carrier in the nature of a chain disposed about the journal of the car so as to dip into and travel through a reservoir of oil contained at the bottom of the journal box when the car is in motion to carry lubricant to the journal bearing. A lubricator of this general kind is not new, but heretofore such mechanical lubricators have not offered satisfactory performance because the carrier tended to wear unduly those parts past or through which it was disposed to travel and moreover there was no assurance that the carrier would remain disposed in operative position under conditions normally expected to be encountered during severe motion of the car. The primary object of the present invention is to retain an endless lubricant carrier of the foregoing kind about the journal of the car in such a manner as to enable the journal bearing to be lubricated without incurring excessive wear on the parts past or through which the carrier is disposed to travel, and to assure that the carrier will not be displaced from operative position by severe motion of the car.

Another reason why chain lubricators have not performed satisfactorily when used with a railway journal is that no means has been afforded to distribute lubricant carried by the chain or like carrier effectively and uniformly along the length of bearing surface engaged by the rotating car journal. Consequently, it was a portion of the bearing only that was furnished with lubricant. A further object of the present invention is to construct the journal bearing with a lubricating system to which oil in the bottom of the journal box is to be relayed by the carrier and distributed uniformly to the engaged interface between the bearing lining and the car journal.

One of the primary requisites to which a journal bearing lubricator should conform is that lubricant be immediately available for the bearing at the commencement of car motion and that lubricant be continuously available to the bearing at low speeds of the car. In this respect, many mechanical lubricators of the prior art have failed for several reasons. At low temperatures, for instance, the lubricators of the prior art become sluggish, particularly where the car has remained idle for a time, and in many such instances have altogether failed to operate. Additionally, such lubricators have not always assured that the bearing is lubricated at low speeds of car travel which accounts for "hot box" problems encountered at low speeds. Further objects of the present invention are to dispose an endless lubricating carrier in the nature of a chain about the journal in such a manner as to assure that the chain picks up the motion of the journal at the commencement of car movement and that lubricant is continuously available to the bearing at low operating speeds.

Further objects of the present invention are to so arrange a chain lubricator relative to the journal and the journal bearing that the chain will be enabled to travel through a slot afforded therefor in the bearing without any substantial wear on the adjacent parts of the bearing; to construct a journal bearing in a way which permits the bearing to be lubricated by oil passed thereto by an endless carrier travelling through a slot in the bearing such that there is developed an oil feeding pressure for enhancing lubricating action; to guard against the chain dropping out of the aforesaid slot in the event of relative displacement between the journal and the journal bearing; to assure that the journal bearing is lubricated proportionally to the speed of the car; and to enable lubricant from a previous operation of the car to be stored in the bearing in such a manner that this is immediately available to the bearing lining upon the commencement of the next operation of the car.

Other and further objects of the present invention will be apparent from the following description and claims and are illustrated in the accompanying drawings which, by way of illustration show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 2 is an elevation of the journal box showing Fig. 1 with the top wall broken away to expose the back of the journal bearing;

Fig. 3 is a plan view of the bottom of the journal bearing;

Fig. 4 is a sectional view taken on the line 4—4 of Figs. 5 and 7;

Fig. 5 is a plan view of the back of the journal bearing;

Fig 6 is a sectional view taken on the line 6—6 of Fig. 5;

Fig. 7 is a sectional view taken on the line 7—7 of Fig. 5;

Fig. 8 is a sectional view taken on the line 8—8 of Fig. 6;

Fig. 9 is a sectional view through the journal and the journal bearing in the journal box;

Fig. 10 is a sectional view on an enlarged scale taken on the line 10—10 of Fig. 5;

Fig. 11 is a detail view on an enlarged scale of a portion of one form of lubricator chain;

Fig. 12 is a sectional view of the portion of the lubricator chain shown in Fig. 11;

Fig. 13 is a plan view of a modified form of lubricating chain;

Fig. 13A is a side elevation of the chain shown in Fig. 13;

Fig. 14 is a plan view of another modified form of lubricating chain;

Fig. 14A is a side elevation of the chain shown in Fig. 14;

Fig. 15 is a plan view of another modified form of lubricating chain;

Fig. 15A is a side elevation of the chain shown in Fig. 15;

Fig. 16 is a plan view of another modified form of lubricating chain;

Fig. 16A is a side elevation illustration the way in which the chain shown in Fig. 16 is assembled;

Fig. 16B is a side elevation of the chain shown in Fig. 16A;

Fig. 17 is a plan view of another modified form of lubricating chain;

Fig. 17A is a side elevation of the chain shown in Fig. 17;

Figure 1:
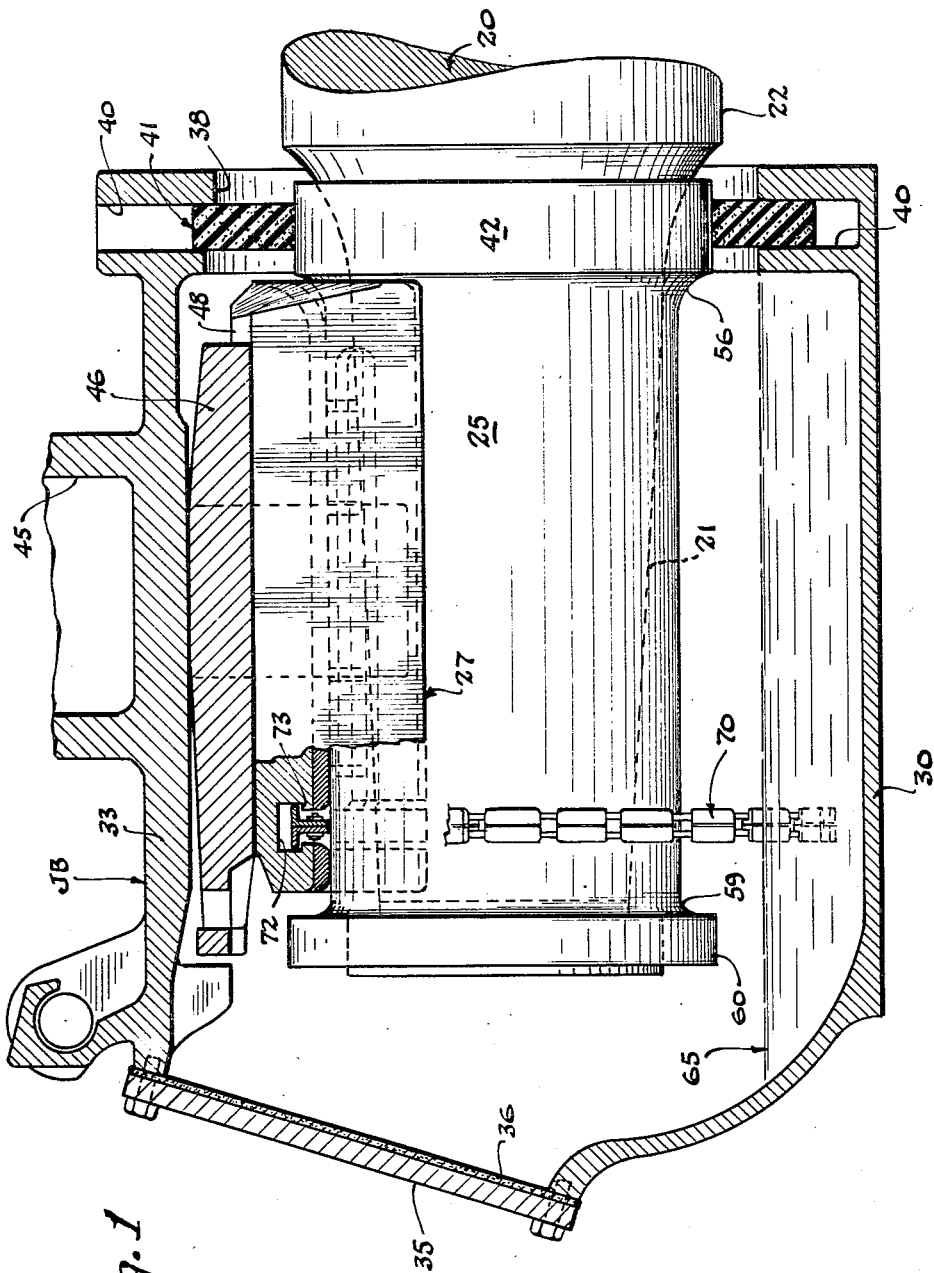
Fig. 1 is a sectional view of a journal box showing the railway journal disposed therein.

For purposes of disclosure, the present invention will be described in connection with the railway journal which is the subject matter of my Patent 2,543,154, patented February 27, 1951. Thus, as shown in Fig. 1 herein, the axle 20 which carries the car wheel includes a journal 21 in the form of a tapered stub which extends into the journal box JB that is associated with the car wheel. The journal 21 includes at one end an enlarged cylindrical portion 22 serving as a wheel seat for the car wheel (not shown) and an elongated sleeve 25 having an internal bore complementary to the taper of the stub 21 is mounted on the end of the journal within the journal box so as to extend axially from the outer end of the journal stub 21 inwardly to be disposed against the wheel seat 22. This sleeve constitutes the bearing surface for the journal and is arranged to cooperate with a flat-backed segmental journal bearing or so-called brass 27 which is located in the top portion of the journal box. The bearing 27 includes a face or lining 28 of Babbitt metal which is arched complementary to the curvature of the journal to engage the journal segmentally in the usual manner.

Thus, the journal box, as shown in Fig. 1, is of conventional form and includes a bottom wall 30, a pair of parallel side walls 31 and 32 extended upwardly from the bottom wall as shown in Fig. 2, and a closed top wall 33. The outer end of the journal box disposed away from the car wheel includes a removable lid 35 having a gasket 36 arranged on the inside thereof in the usual manner, and the opposite or inner end of the journal box disposed adjacent the car wheel is formed with an enlarged circular opening 38 through which the journal portion of the axle may be projected into the journal box. This end of the journal box includes a vertically disposed slot 40 about the side and bottom walls of the journal box and which is open at the top to permit a conventional horseshoe-shaped dust guard or seal 41 to be removably disposed therein in transverse relation to the axis of the journal. The guard 41 is formed with an opening in the medial portion thereof to permit the guard to be mounted tightly about a dust guard seat 42 which is formed on the end of the bearing sleeve 25 disposed against the car wheel seat 22 on the axle 20. The dust guard 41 in accordance with conventional practice affords a rear wall for the journal box sealing off that end of the journal box which is disposed adjacent the car wheel.

The top wall of the journal box is formed with an upstanding boss affording a recess 45 in which the post of the truck for the railway car is to be mounted in the usual way, and beneath this mounting recess 45 in the top wall of the box is positioned a flat-bottomed wedge 46 of standard construction having a back arched from front to rear to wedge the journal bearing 27 accurately in position for engaging the journal bearing surface as afforded by the sleeve 25. The journal bearing 27 is formed at one end with an upstanding flange 48 which extends from one side of the bearing 27 across to the other. This flange is adapted to be engaged by the rear end portion of the wedge 46 when the latter is properly positioned as shown in Fig. 1. Internal blocks as 51 and 52, Fig. 2, formed on either side wall of the journal box within the cavity thereof are disposed vertically relative to the sides of the brass 27 so as to limit circumferential shifting of the brass 27 on the journal sleeve 25, and cooperating with these blocks 51 and 52 are a pair of lugs 53 and 54, Fig. 2, projecting laterally from either side of the brass at the forward or outer end thereof.

The portion at the inner end of the journal bearing 27 beneath the wedge 48 and coextensive with the Babbitt lining 28 is rounded at 55, as shown in Fig. 6, so as to be complementary in configuration to an outwardly filleted surface 56, Fig. 1, formed on the sleeve 25 adjacent the dust guard seat. The journal bearing 27 at the outer end opposite the filleted surface 56 is rounded at 58 so as to be complementary to another filleted surface 59 which is formed on the sleeve 25 in association with an annular flange or hub 60. The dimension of the hub portion 60 of the sleeve 25 is such that the peripheral edge projects radially beyond the brass 27, and the complementary rounded surfaces described above define the extent to which the journal may shift axially relative to the brass.

The journal bearing 27 in the present instance is to be lubricated with liquid lubricant as oil 65 carried in the rounded bottom portion of the journal box serving as an oil reservoir, and in accordance with the present invention this lubricant is to be supplied to and distributed along the journal bearing so as to lubricate the engaged bearing surfaces afforded by the Babbitt lining 28 and the bearing sleeve 25. The way in which the journal bearing 27 is constructed to achieve this result and the manner in which lubricant is passed thereto will now be described.

An endless flexible carrier in the form of a relatively heavy chain 70 serving as an oil conveyor is disposed transversely across the outer end of the journal extended into the journal box in normal relation to the axis of the journal. The chain 70 is of such length that the lower end portion thereof dips into the supply of oil 65 at the bottom of the journal box as shown in Fig. 1 but is maintained out of engagement with the bottom of the journal box as shown in Figs. 1 and 9 so as to be able to pass freely through the oil. The upper portion of the chain is disposed in an arcuate undercut slot 72 which is formed about the end portion of the journal bearing 27 disposed toward the journal box lid and opens at either side of the bearing below the lugs 53 and 54 respectively. The slot 72 is located in the bearing lining at the underside of the bearing 27 and extends part way up into the brass portion. In the present instance, the undercutting of the slot 72 is such as to be T-shaped in section, affording arcuate shoulders 73 disposed in the brass portion of the bearing above the Babbitt lining, and these shoulders extend laterally across the bearing from one side to the other in normal relation to the axis of the journal. Thus, the top side of the slot 72 away from the journal 25 is closed, but the lower side opens on to the journal. Portions of the chain 70 which will be described below are disposed to extend across the slot 72 above the shoulders 73 but are normally held disengaged relative thereto. Other portions of the chain 70 extend through the T-slot to engage the journal as shown in Fig. 1 so that rotation of the journal during travel of the railway car carries the chain continuously through the slot 72 and the oil supply at the bottom of the box to transport oil upwardly to the slot 72.

Thus, the chain 70 includes pairs of inverted L-shaped symmetrical lugs 75, Fig. 11, each having a flange 76 and a web 77 integral therewith. The web 77 extends at right angles to the flange 76, and the lugs 75 are connected back-to-back in pairs in a manner to be described in more detail below.

As was noted hereinabove, the chain 70 travels through the T-shaped slot 72 as an incident to rotation of the journal 20, and depending upon the direction of rotation of the journal the chain enters the slot below one of the lugs 53 or 54 and passes out of the slot beneath the other of these lugs. This action, especially during high speeds of the railway car, is of considerable magnitude, and to enable the chain 70 to pass normally unimpeded through the slot 72, the parts are proportioned so that engagement of the chain with the brass and the Babbitt lining will be at a minimum. To enable this to be accomplished, the portion of the undercut slot 72 which is formed in the Babbitt lining is chamfered outwardly at 28A, Fig. 10, away from the backs or webs of the lugs 75, and the width of the flanges 76 is selected such as to hold the lugs 75 away from these parts of the bearing. Engagement with the brass portion of the journal bearing represented by the shoulders 73 of the slot 72 is prevented in the present instance by having the webs 77 of the lugs 75 of greater length than the distance between the shoulders 73 of the slot 72 and the bearing surface of the journal when the latter engages the Babbitt lining 28. This disposes the flanges 76 of the chain in the T-shaped slot above the shoulder portions 73 and the ends of the webs 77 on the periphery on the journal 25. As can be seen in Fig. 9, the chain 70 hangs loosely on the journal and the web portions of the chain lugs engage the upper peripheral portion of the journal for at least 180° of arc which assures that the chain will pick up the motion of the journal when the car first moves. Moreover, while the momentum of the chain 70 in the T-shaped slot during normal running of the railway car may be of considerable magnitude, no excessive wear of the chain on the journal bearing will be encountered, and the chain will normally pass through the slot 72 without substantial impedance. In the event of relative vertical displacement between the journal box and the journal causing the journal bearing 27 to be lifted away from the journal, the chain 70 is prevented from dropping out of the T-shaped slot 72 by reason of the flanges 76 of the lugs engaging the shoulder portions 73 of the T-shaped slot.

The pairs of lugs 75 in each set are interconnected in the fashion of a patch link bicycle chain. Thus, as shown in Figs. 11 to 12, pintles 80 having reduced end portions are passed laterally through openings as 77A formed in the webs 77 of the lugs 75 at either end thereof. Links 81 and 82 having apertures as 81A formed in either end thereof are disposed with the apertures 81A arranged about ends of the pintles projected beyond the exposed sides of the two webs 77 that are associated with immediately adjacent sets of the lugs 75 as shown in Fig. 12. The ends of the pintles associated with the link 81 are upset as at 80U, and C-shaped snap springs 83 of the kind shown in Fig. 11 are pressed onto the reduced portions of the pintles 80 at the ends thereof opposite the upset heads 80U and are held against displacement by retainer heads 80R formed on these ends of the pintles. In this manner, the immediately adjacent pairs of lugs 75 making up the chain 70 are interconnected as and endless set, and the flanges afforded by such pairs project in opposite directions but in the same plane.

During the passage of the chain 70 through the oil reservoir, the oppositely extended arms 76 of the lugs 75 pick up oil which is carried upwardly to the undercut slot 72 in the bearing. The bearing 27 is so constructed in accordance with the present invention as to receive this oil from the chain 70 and distribute controlled amounts thereof to the engaged bearing surfaces afforded by the Babbitt lining 28 and the bearing sleeve 25 on the journal. The journal bearing 27 in the present instance is illustrated as being in the form of a so-called flat-backed bearing, since the portion of the bearing engaged with the wedge 46 lies in a flat horizontal plane. In accordance with the present invention, this flat-backed portion of the bearing 27 is provided with an oil reservoir afforded by recessing the backs of the bearing to a substantial depth along either side thereof. Two oil chambers 85 and 86 are thus afforded which extend substantially for the length of the bearing 27 in the back thereof, and leading downwardly from the chambers 85 and 86 to the bearing face of the Babbitt lining 28 are a plurality of vertical oil passages 85A and 86A respectively which are arranged in a row at the bottom of the respective chambers 85 and 86. The oil passages 85A and 86A open into axially extended distributing channels 88 and 89 formed along the bearing face of the Babbitt liner 28 as shown in Fig. 3, so as to be below and parallel with the supply chambers 85 and 86. Accordingly, oil in the chambers 85 and 86 is adapted to be distributed in this manner to the engaged bearing surfaces afforded by the Babbitt lining and the bearing sleeve 25 disposed on the journal, and in this connection it will be noted from Fig. 3 that the distributing channels 88 and 89 are closed at the end corresponding to the inner end of the journal while at the opposite end the channels 88 and 89 open into the T-slot 72.

As will be apparent from the description to follow, the chain 70 serves both as a pump for creating a pressure head of oil and a conveyor for feeding oil to the oil chambers 85 and 86 in the back of the journal bearing 27. To permit these actions to occur, the inner end of the journal bearing 27 in the portion thereof coextensive with the undercut slot 72 is formed with a pair of vertical oil inlet passages 93 and 94 disposed at either side of the journal 20 as can be seen in Figs. 8 and 9. These two oil passages at their lower ends open into the slot 72 in the journal bearing and lead upwardly through the brass to open into shallow cups 93C and 94C, Fig. 8, which are located at the ends of the oil chambers 85 and 86 so that lubricant fed to the cups 93C and 94C will spill into one or the other of the oil chambers 85 and 86, depending upon the direction of rotation of the journal and the chain 70.

The oil chambers 85 and 86 in the back of the journal bearing are afforded by casting the brass in such a manner as to afford flat ledges extended peripherally about the chambers 85 and 86 so as to confine the oil therein. Moreover, these same ledges engage the underside of the wedge 46 which serves to afford a cover for the chambers 85 and 86. Thus, the flat-backed portion of the bearing 27 is afforded by a pair of flat ledges 95 and 96, one at either side of the brass, and a pair of flat end ledges 97 and 98 which encompass the chambers 85 and 86. These ledges are all in a common horizontal plane defining the top of the oil chambers 85 and 86, and the two end ledges 97 and 98 include portions 97A and 98A, respectively, which extend inwardly toward the central or medial portion of the back of the bearing 27. Spaced inwardly of the side ledges 95 and 96 and within the oil chambers 85 and 86 are a pair of flat-topped vertical columns 101 and 102 which are also spaced from the inner ends of the ledge extensions 97A and 98A, and the tops of these columns afford additional ledges in the aforementioned common plane for supporting the lower flat face of the wedge 46.

Interconnecting the oil chambers 85 and 86 in the back of the bearing 27 is a lateral or transverse passageway 104, Fig. 5, which is relatively shallow in nature, this passageway being disposed centrally in the bearing between the end ledges 97A and 98A and the two columns 101 and 102. Diagonally extended channels 105A and 106A lead through the passageway 104 from one oil chamber to the other, and these channels 105A and 106A are of progressively increasing depth in the direction from the passageway 104 to the oil chambers 85 and 86.

The chambers 85 and 86 have inwardly sloped sides 110, as shown in Figs. 7 and 9, and rounded bottoms 112 in the longitudinal extents thereof lying between the side ledges 95 and 96 and the associated columns 101 and 102. Thus, the portions of the oil chambers 85 and 86 adjacent the side ledges 95 and 96 are substantially V-shaped in section, and those portions of the chambers 85 and 86 which are adjacent the sides of the end ledge extensions 97A and 98A are flattened as shown in Fig. 7, so that such oil as is fed into these supply chambers by the chain 70 will collect in the flattened portions thereof and feed by gravity downwardly through the oil passages 85A and 86A and into the axially extended distributing channels 88 and 89 formed in the bearing face of the Babbitt lining. When the rotation of the journal occurs at sufficiently high speed to force oil into one or the other of the chambers 85 and 86 (depending upon direction of the rotation of the journal as viewed in Fig. 9) to raise the level above the shallow passageway 104, oil will flow through the diagonal distributing channels 105A and 106A from the oil chamber at one side of the bearing to the oil chamber at the other whereby lubricant will feed down through the openings 85A and 86A in the distributing chanels 88 and 89 at both sides of the journal, and from this it will be apparent that the lubricating system in the present instance is responsive to the demand for more lubrication at high speeds. It should also be noted that when rotation of the journal ceases, oil last fed to the chamber 85 or 86 will be trapped therein by the stationary journal and will afford a supply immediately available for lubrication when the motion of the railway car is again commenced. It will, therefore, be seen that the journal will be lubricated instantly when motion of the railway car is commenced, and as the speed of the car increases the chain 70 is effective to pump more and more oil into the reservoir provided in the back of the bearing, and distribution of the oil thus pumped takes place at a rate proportioned to the speed of the car. Ancillary to this is the heat exchange which will take place as the chain 70 is effective to pass relatively cool lubricant from the bottom of the journal box, where the lubricant is subject to windage about the outside of the box, up to the bearing surfaces.

As was noted in the description hereinabove, the distributing channels 88 and 89 extended axially along the face of the Babbit lining 28 communicate at one end with the T-slot 72 as shown in Fig. 3, and, hence, during passage of the chain 70 through the T-slot 72 excesses of oil carried by the chain will be passed directly to the channels 88 and 89 to be distributed along the rotating sleeve 25 of the journal.

In Figs. 13 to 17, inclusive, there are illustrated several different kinds of relatively heavy endless lubricating carriers in the form of chains adapted to pass lubricant from the bottom of the journal box up to the oil distributing passages formed in the slot 72 of the bearing. One such chain, 110, is illustrated in Figs. 13 and 13A as comprising a set of lugs 111 each including a flange 112 and a web 113 disposed at right angles one to the other. These lugs are to be spaced apart circumferentially from one another about the chain so that there may be arranged in staggered relation therebetween and on one side thereof a series of connecting link plates 114. The links 114 are similar in size and shape to the lugs 111, each including a flange 115 and a web 116 disposed at right angles one to the other.

To couple the chain lugs 111, the latter are each provided with pairs of pins as 117 which project from the sides of the webs 113 on which the links 114 are to be assembled. The pins 117 are arranged in spaced relation, and corresponding openings are provided in the link webs 116 to enable a link 114 to be assembled on the trailing pin of one chain lug and the leading pin of the next successive chain lug. Such assemblage disposes the end portions of the lug and link webs in back-to-back relation, and by swaging over the ends of the pins 117 projected through the openings therefor in the links 114, an endless chain is afforded wherein the alternating flanges of the lugs and links are adapted to travel above the shoulder portions of the undercut slot 72 afforded at the end of the journal bearing.

In Figs. 14 and 14A there is shown a modified form of the chain 110. In this instance, a chain 110A is afforded wherein the lugs are arranged directly opposite one another as in-line pairs with the webs thereof disposed adjacent one another and the flanges 112 in opposed alignment, and to enable the lugs to be connected as successive pairs, pins 117A are passed through corresponding openings that register one with the other at the leading and trailing ends of the webs 113. Links as 118 of smaller dimension than the lugs 111 are formed at either end with a pair of openings corresponding to the leading and trailing pins carried by successive pairs of lugs, so that by assembling such links on the medial portions of the pins extended between the lug webs, the lugs may be interconnected as an endless chain by swaging over the ends of the pins projected beyond the openings provided therefor in the webs of the lugs. The lugs 111 in the chain 110A are spaced laterally apart a distance corresponding to the width of the links 118, and the oppositely extended flanges 112 are adapted to ride above the shoulders of the T-slot 72 as described above in connection with the lubricating chain 70.

In Figs. 15 and 15A there is shown a chain 110B somewhat similar in nature to the chain 110A in that the lugs 111A in this chain are to be assembled as in-line pairs. In this instance, however, H-shaped links 119 are afforded each having a pair of spaced-apart parallel arms 119A interconnected at the medial portions by a web 119W. At either end, the arms 119A are each formed with ears 119E which project inwardly toward one another and which are adapted to fit into corresponding openings as 119P formed at the opposite ends of the lug webs 113. The lugs are first arranged as pairs with the webs thereof in back-to-back relation, and the ears 119E of the links are then disposed in the openings 119P.

In Figs. 16, 16A and 16B a chain 120 is illustrated as comprising circumferentially displaced lugs 121 each of which is formed with a flange 122 and a web 123 disposed at right angles one to the other. Elongated slots 124 are formed in the webs of the lugs thus afforded, and these enable the lugs to be interconnected by circumferentially displaced links 125. Each link 125 includes a flange 126 and a web 127 disposed at right angles one to the other, and the arrangement in the chain is such that the flanges of the links 125 extend in a direction opposite to that of the flanges 122. The links 125 in turn are formed with arms as 128 at either end, and these arms are formed with inwardly projecting ears 129A and 129B disposed at right angles to the axes of the arms 128. The ears 129A and 129B are of greater length than the shorter dimension of the slots 124 but are of less length than the longer dimension, so that the chain may be assembled by first passing the ears 129A and 129B at either end of a link 125 through a pair of slots 124 afforded by a corresponding pair of lugs 121 from one side thereof and parallel to the longer dimensions of these slots as shown in Fig. 16A. Then, by turning such lugs clockwise and counterclockwise, respectively, the ears 129A and 129B are disposed at right angles to the longer dimension of the corresponding slots 124 which locks a pair of lugs 121 loosely to a link 125.

In Figs. 17 and 17A a chain 130 is illustrated as comprising lugs 131 each of which includes a flange 132 and a web 133 arranged at right angles one to the other. Two such lugs are adapted to be arranged opposite one another in a set with the webs thereof engaged back-to-back in a relation similar to that for chain 110B, so that the respective flanges thereof project in opposite directions as shown in Fig. 17. A spot weld or rivet 131A is afforded between the webs of such a set to rigidly connect the lugs together, and to pivotally interconnect the sets as thus afforded the trailing end of the web in one such lug in a set is formed with a rearwardly projecting arm 135 having an enlarged head 138. The leading end of the other lug in the set is formed into a forwardly projecting arm 137 having an enlarged head as 138, and the heads thus afforded are adapted to fit into openings as 140 and 141 formed respectively at the leading and trailing ends of the lugs in a set. In this manner one set of lugs is enabled to turn freely on the next successive set.

Figure 21:
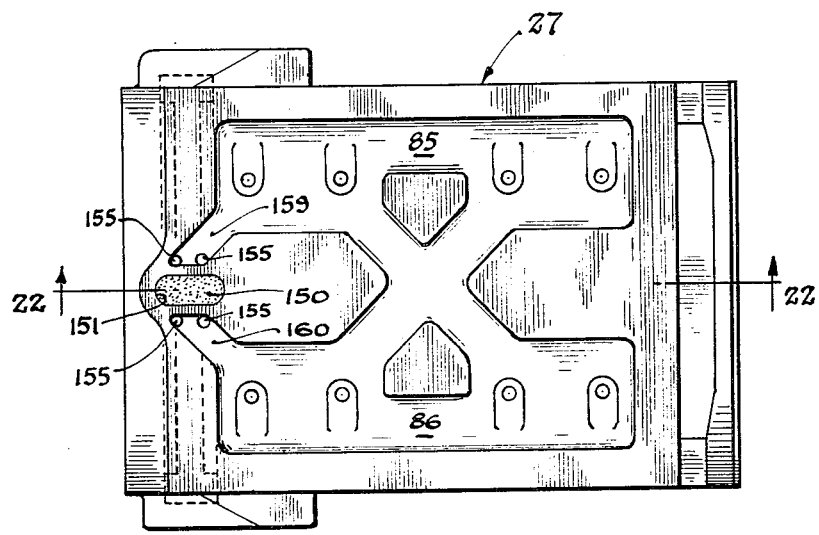
Fig. 21 is a plan view of the back of the modified journal bearing.
Figure 22:
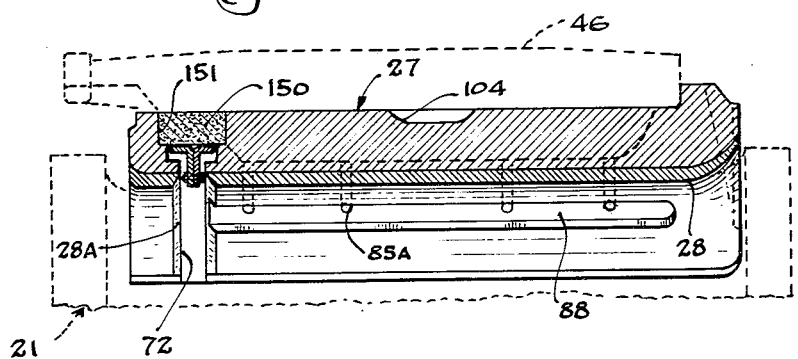
Fig. 22 is a sectional view taken on the line 22—22 of Fig. 21.

At extremely low speeds of car travel, say around one-half mile per hour or when the car first commences motion, it is important to assure that the endless lubricating carrier operated by the journal is capable of supplying the reservoirs as 85 and 86 in the back of the bearing with an adequate head of lubricant. To enable this to be accomplished, the bearing 27 may be modified to include a resilient vane 150, Figs. 18, 21 and 22, disposed at the crown of the bearing above the T-slot 72 therein in position to wipe the top of the lubricating carrier such as the flanges 76, Fig. 10. To this end, an opening 151, Figs. 21 and 22, is formed in the crown of the bearing 27 above the T-slot 72, and the vane 150 is arranged therein with the lower end portion thereof extended through the opening 151 to wipe the top of the chain as 70 traveling through the T-slot. In the present instance, the vane 150 is in the form of a felt pad which is cemented or otherwise suitably fixed in the bearing.

Disposed on either side of the vane 150 are a pair of vertical passages 155 and 156, Fig. 21, which open at one end into the T-slot at either side of the vane 150 and which at the other end open into relatively shallow channels 159 and 160 arranged to feed lubricant to the reservoirs 85 and 86 in a manner that will be described presently. Thus, there is a feed channel 159 allocated to the openings 155 on one side of the vane 150 and another feed channel 160 allocated to the openings 156 at the other side of the vane.

When the journal rotates, the lubricating chain is caused to travel past the wiper, and oil is carried upwardly from the bottom of the journal box toward one side or the other of the vane 150, depending upon the direction of rotation of the journal. Accordingly, a relatively high pressure head is immediately established at one side of the vane 150 effective to force oil trapped by the vane up through the passages 155 or 156 depending upon which side of the vane lubricant is accumulated. Lubricant thus pumped spills into one or the other of the feed channels 159 and 160 and flows therefrom into one or the other of the reservoirs 85 and 86 to be distributed by gravity through the passages as 85A and 86A on to the engaging bearing surface as described above.

It will be appreciated that vanes other than the felt pad 150 may be resorted to. Thus, for instance, a pad of oil-resistant rubber such as Neoprene may be utilized, or a steel roller may be arranged in a retaining socket in the crown of the bearing to engage the top of the lubricating carrier.

The oil passages 155 and 156 are selected as to size on the basis of the total cross-sectional area of the passages 85A and 86A to assure that oil in the reservoirs 85 and 86 is not distributed to the engaged bearing surfaces at a greater rate than that at which oil is supplied to these reservoirs. An example of such proportioning is a diameter of 3/16 inch for the passages 155 and 156 as compared to a diameter of 1/8 inch for the passages 85A and 86A which for purposes of disclosure are four in number in each instance.

Figure 18:
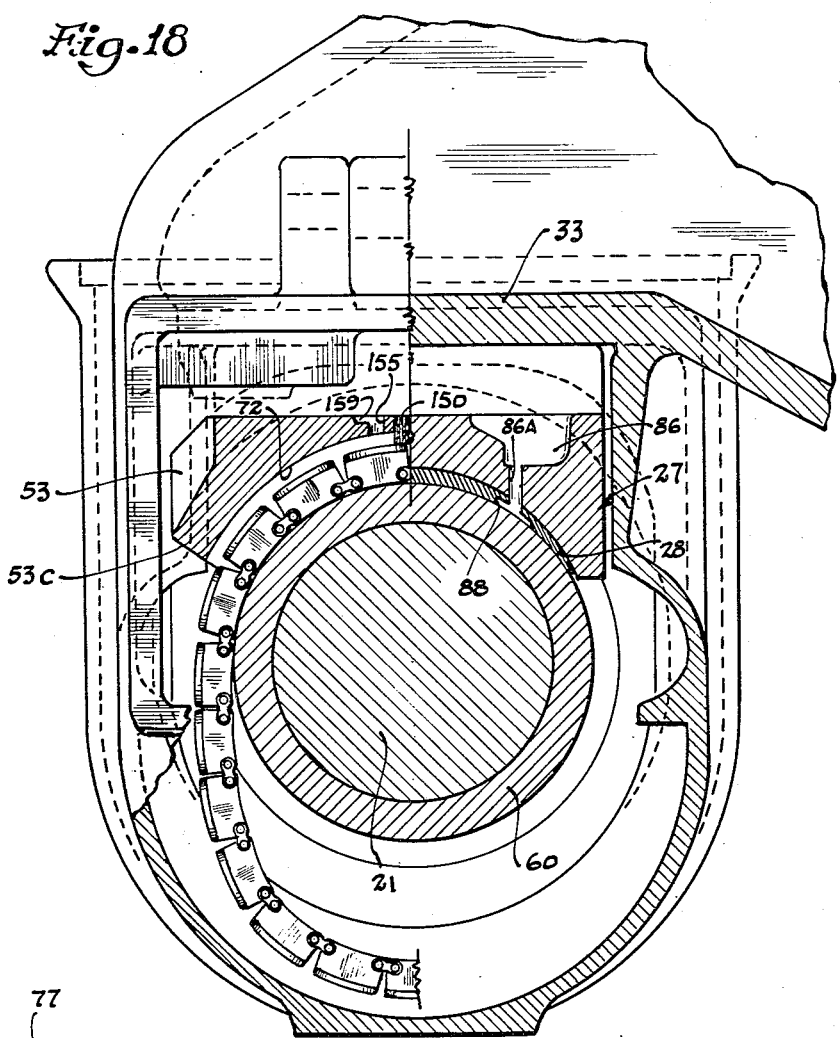
Fig. 18 is a sectional view similiar to Fig. 9 illustrating a modification of the invention.
Figure 19:
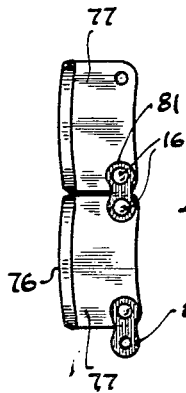
Fig. 19 is a detail side elevation view of an enlarged scale of a portion of a modified lubricator chain.
Figure 20:
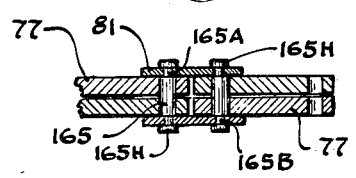
Fig. 20 is a sectional view of the portion of the chain shown in Fig. 19.

The chain 70 may be modified to provide a chain 70A, Fig. 18, that incorporates a standard link construction as distinguished from the patch link construction illustrated in Figs. 11 and 12. Thus, as shown particularly in Figs. 19 and 20, pins as 165 having reduced end portions 165A and 165B are extended through corresponding openings in the lug webs 77 and the chain links 81 and the reduced end portions of these pins extended beyond the sides of the links are swaged over to provide heads as 165H.

It has been found advantageous to chamfer the bearing lugs 53 and 54 at the sides of the bearing to enable an efficient passage of lubricant into the T-slot to be effected. Thus, the portions of the bearing lugs 53 and 54 disposed adjacent either end of the T-slot 72 are cut back along a vertical slope as at 53C, Fig. 18, and this enables an increased amount of lubricant to be carried up into the T-slot by the endless lubricating carrier.

Thus, while I have illustrated and described the preferred embodiment of my invention, it is to be understood that these are capable of variation and modification, and I therefore do not wish to be limited to the precise details set forth, but desire to avail myself of such changes and alterations as fall within the purview of the following claims.

I claim:

1. A lubricator for the bearing of a railway journal extended into a journal box afforded therefor comprising a journal bearing having a reservoir formed in the back thereof in which lubricant may be retained, a passage in the bearing leading from said reservoir to the face of the bearing to permit the bearing to be lubricated by lubricant supplied to said reservoir, an undercut slot formed in the bearing over the journal and having shoulders extended laterally across the bearing from one side thereof to the other, another passage in the bearing leading from said slot to said reservoir through which lubricant may be passed to said reservoir, and an endless T-shaped chain arranged in the slot to dip into a reservoir for lubricant in the bottom of the journal box, said chain including flanges disposed to travel above the shoulders of said slot to retain the chain against displacement, and said chain including web portions extended through said slot to engage the periphery of the journal so that rotation of the journal causes the chain to traverse said slot and transport lubricant to the passage leading to said reservoir.

2. A lubricator for the bearing of a railway journal extended into a journal box afforded therefor comprising a journal bearing having a reservoir in the back thereof afforded by recesses along either side of the bearing in which lubricant may be retained, passages in the bearing leading from said recesses respectively to channels in the face of the bearing to permit the bearing to be lubricated by lubricant supplied to said recesses, an undercut slot formed in the bearing and having shoulders extended laterally across the bearing from one side thereof to the other, a pair of passages in the bearing leading from said slot respectively to said recesses through which lubricant may be passed to said recesses, and an endless T-shaped chain arranged in the slot to dip into a reservoir for lubricant in the bottom of the journal box, said chain having a portion thereof extended through said slot to engage the journal so that rotation of the journal causes the chain to traverse said slot to transport lubricant to one or the other of the passages leading to said recesses depending upon the direction of rotation of the journal.

3. A lubricator for the bearing of a railway journal extended into a journal box afforded therefor comprising a journal bearing having a recess formed in the back thereof along either side in which lubricant may be retained, passages in the bearing leading from said recesses to the face of the bearing to permit the bearing to be lubricated by lubricant supplied to said recesses, a recess in the back of the bearing interconnecting the recesses along the sides so that an excess of lubricant in either of the side recesses may over-flow into the other, an undercut slot formed in the bearing over the journal and having shoulders extended laterally across the bearing from one side thereof to the other, passages in the bearing leading from said slot respectively to said recesses at the sides of the bearing, and an endless chain arranged in the slot to dip into a reservoir for lubricant in the bottom of the journal box, said chain having a portion thereof extended through said slot that is adapted to engage the periphery of the journal so that the chain will pick up rotation of the journal and travel through said slot to transport lubricant to one or the other of the passages leading to said recesses in the back of the bearing depending upon the direction of rotation of the journal, and said chain comprising flanges normally disposed above the shoulders of the slot to prevent displacement of the chain therefrom.

4. A journal bearing of the kind described adapted to be used with an endless T-shaped lubricant carrier and having a reservoir afforded in the back thereof in which lubricant may be retained, a passage for lubricant extended downwardly through the bearing from said reservoir to the face of the bearing, a T-shaped slot extended laterally across the bearing from one side to the other in which said carrier may be disposed to travel while retained against displacement from the slot to carry lubricant to said slot, and another passage extended upwardly through the bearing from said slot to said reservoir to transmit lubricant on the carrier to said reservoir.

5. A journal bearing of the kind described having a recess formed in the back thereof along either side in which lubricant may be retained, passages for lubricant extended downwardly through the bearing from said recesses respectively to the face of the bearing to enable the bearing to be lubricated by lubricant in either of said recesses, a recess in the back of the bearing interconnecting said recesses so that an excess of lubricant in one of said recesses may over-flow into the other, a T-shaped slot in the bearing adapted to receive a complementary endless T-shaped lubricant carrier, and passages for lubricant extended upwardly from said slot to said recesses.

6. A journal bearing of the kind described adapted to be used with an endless T-shaped lubricant carrier operated by the journal and having a recess formed in the back thereof along either side in which lubricant may be retained, passages for lubricant extended downwardly through the bearing respectively from said recesses to the face of the bearing, an undercut T-shaped slot complementary to said T-shaped lubricant carrier and extended laterally across the bearing from one side to the other in which said carrier may be disposed to travel while retained against displacement therefrom to carry lubricant to said slot, and passages extended upwardly through the bearing from said slot respectively to said recesses to transmit lubricant on the carrier to one or the other of said recesses depending upon the direction of rotation of the journal.

7. A journal bearing of the kind described adapted to be used with a T-shaped chain operated by the journal and having a recess formed in the back thereof along either side in which lubricant may be retained, passages for lubricant extended downwardly through the bearing respectively from said recesses to the face of the bearing, a T-shaped slot extended laterally across the bearing from one side to the other in which said chain may be disposed to travel while retained therein against displacement therefrom to carry lubricant to said slot, and passages extended upwardly through the bearing from said slot respectively to said recesses to transmit lubricant carried by the chain to one or the other of said recesses.

8. A journal bearing of the kind described adapted to be used with a T-shaped chain operated by the journal and having a recess formed in the back thereof along either side in which lubricant may be retained, passages for lubricant extended downwardly through the bearing respectively from said recesses to distributing channels formed in the face of the bearing, a passageway interconnecting said recesses to enable an excess of lubricant in one recess to over-flow into the other, a T-shaped slot extended laterally across the bearing from one side to the other so as to be above the journal and in which said chain may be disposed to travel with a portion thereby engaging the journal, and a pair of passages extended upwardly through the bearing from said slot respectively to said recesses to transmit lubricant on the chain travelling through said slot to one or the other of said recesses depending upon the direction of rotation of the journal.

9. A lubricator of the kind described including a bearing having an arcuate face for engaging a journal and being formed with an oil reservoir in the back thereof, at least one oil passage in the bearing leading downwardly from the reservoir to the face of the bearing for directing oil in the reservoir to the engageable surfaces of the journal and the bearing, an arcuate T-shaped slot formed in the face of the bearing to extend laterally across the bearing from one side to the other and in which a complementary T-shaped endless lubricating carrier may be disposed to transversely engage a portion of the journal and be driven thereby continuously through said slot in one direction or the other while the journal is rotating to carry oil from a source of supply for oil to said slot, a vane attached to the bearing in position to wipe the top of said carrier travelling through the slot and thereby cause oil to accumulate on one side of the vane, and an oil passage formed in the bearing on the said one side of the vane to enable the carrier passing through the slot to force oil accumulated by the vane up into the reservoir in the back of the bearing.

10. A lubricant for a journal or the like and comprising a journal bearing formed with an oil reservoir in the back thereof, at least one oil passage in the bearing leading from the reservoir to the face of the bearing for directing oil in the reservoir to the engageable surfaces of the journal and the bearing, a T-shaped slot formed in the bearing to extend from one side thereof across to the other and in which a complementary T-shaped endless lubricating carrier adapted to be driven by the journal may be disposed to travel to carry oil from a source of supply of oil adjacent the journal to said slot, means enabling a vane to be attached to the bearing in position to wipe said chain travelling through the slot and thereby cause oil to accumulate on one side or the other of the vane depending upon the direction of rotation of the journal, and oil passages formed in the bearing to be on either side of the vane to thereby enable the lubricant carrier passing through the slot to force oil accumulated by the vane into the reservoir in the back of the bearing.

11. A lubricator for the bearing of a railway journal extended into a journal box afforded therefor comprising a journal bearing having an arcuate face for engaging the journal and being formed with an oil reservoir in the back thereof, at least one oil passage in the bearing leading downwardly from the reservoir to the face of the bearing for directing oil in the reservoir to the engageable surfaces of the journal and the bearing, an arcuate T-shaped slot formed in the face of the bearing to extend laterally across the bearing from one side to the other and in which a complementary T-shaped endless lubricating carrier may be disposed to transversely engage a portion of the journal and be driven thereby continuously through said slot in one direction or the other while the journal is rotating to carry oil from the bottom of the journal box upwardly to said slot, a vane attached to the crown of the bearing face to wipe the top of said carrier travelling through the slot and thereby cause oil to accumulate on one side or the other of the wiper depending upon the direction of rotation of the journal, and an oil passage formed in the bearing on either side of the vane closely adjacent thereto to enable the chain passing through the slot to force oil accumulated by the vane up into the reservoir in the back of the bearing.

12. A journal bearing of the kind described having an arcuate bearing face formed with a T-shaped guide slot through which an endless lubricating carrier of complementary T-shape may be run, distributing passages for lubricant at spaced points on opposite sides of the crown of the bearing and opening into said guide slot, and means at the crown of the bearing acting to restrict the effective cross sectional area of said slot adjacent said distributing passages and serving to force lubricant on the carrier into one or the other of said passages depending upon the direction of rotation of the carrier through said slot.

References Cited in the file of this patent

UNITED STATES PATENTS 2,175,659     Blackmore _____ Oct. 10, 1939

FOREIGN PATENTS 332,872     Germany _____ Feb. 12, 1921